No. 755,614. PATENTED MAR. 29, 1904.
W. L. CASADAY.
GANG PLOW.
APPLICATION FILED MAY 7, 1903.
NO MODEL. 8 SHEETS—SHEET 2.

Witnesses. Inventor.
William L. Casaday
By his Atty.

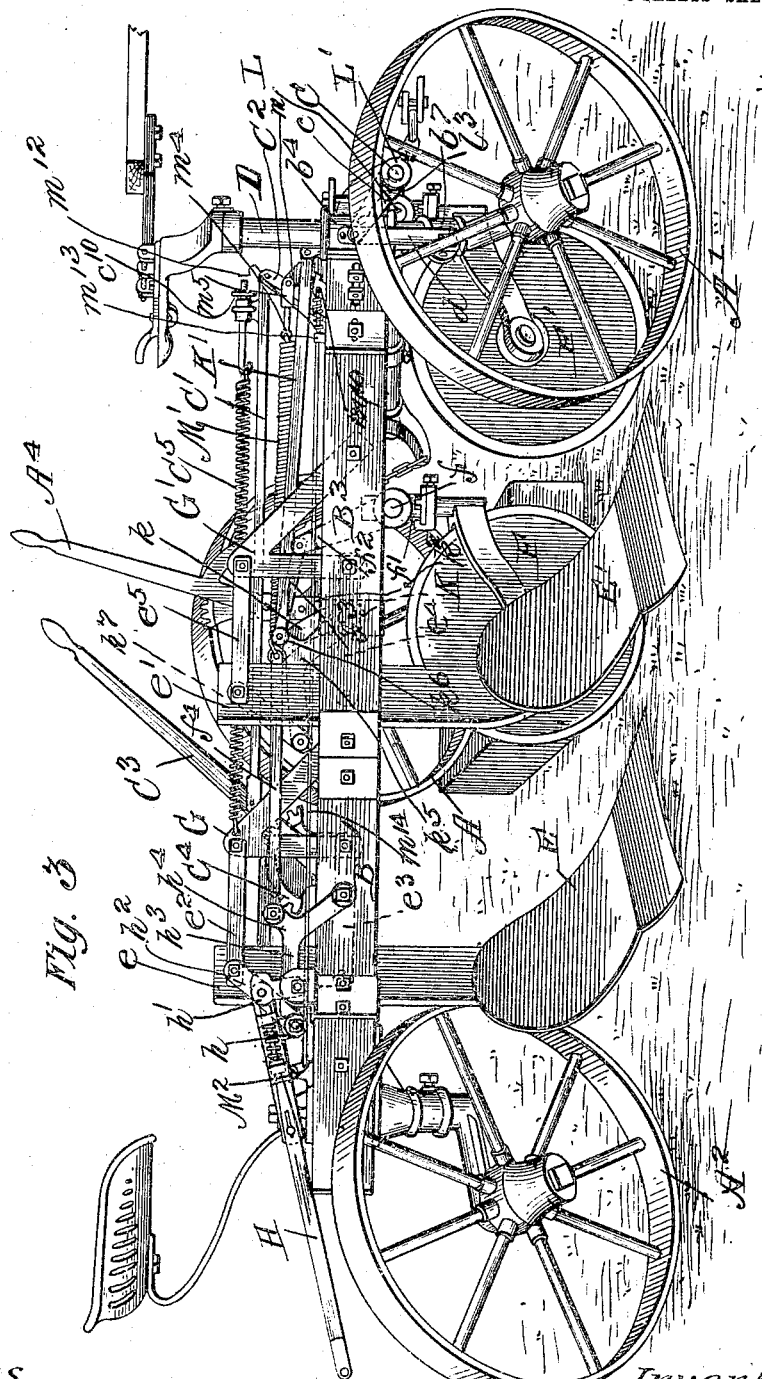

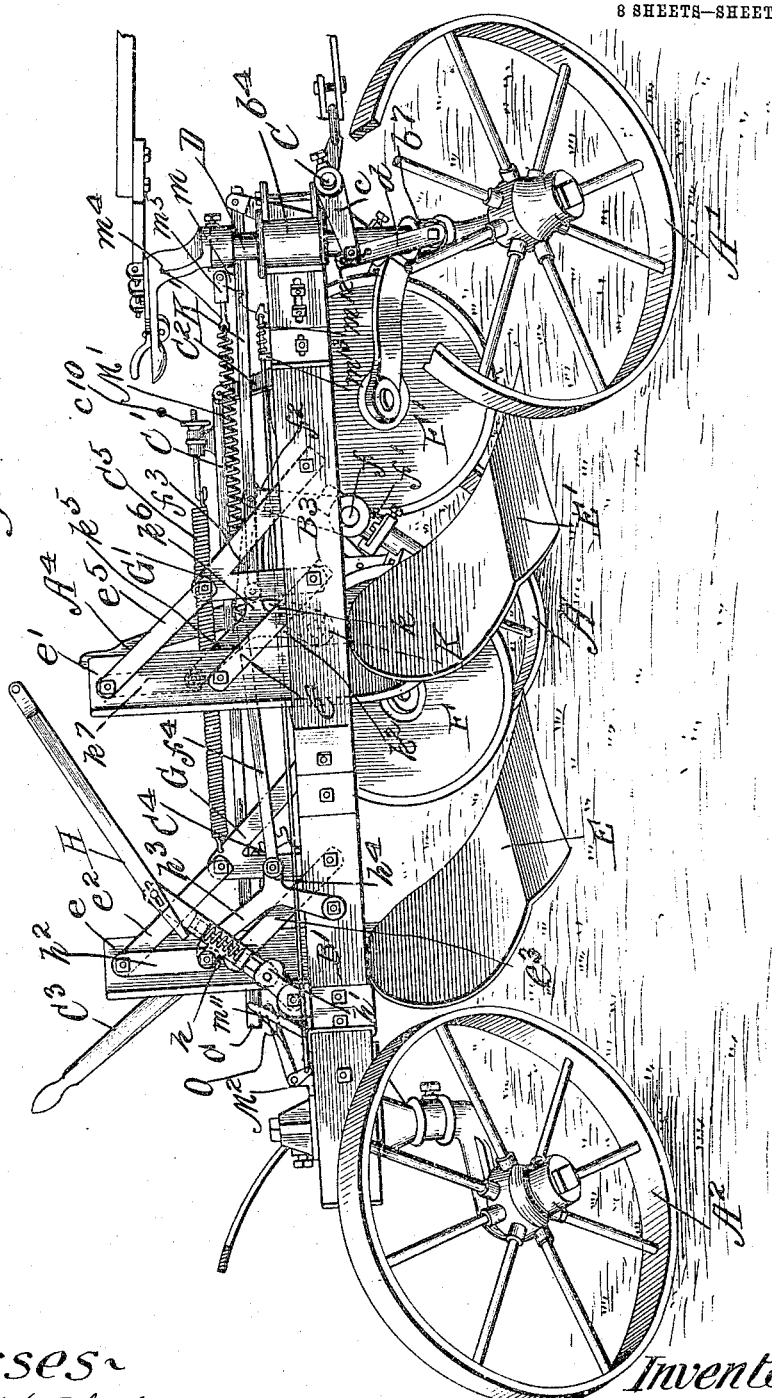

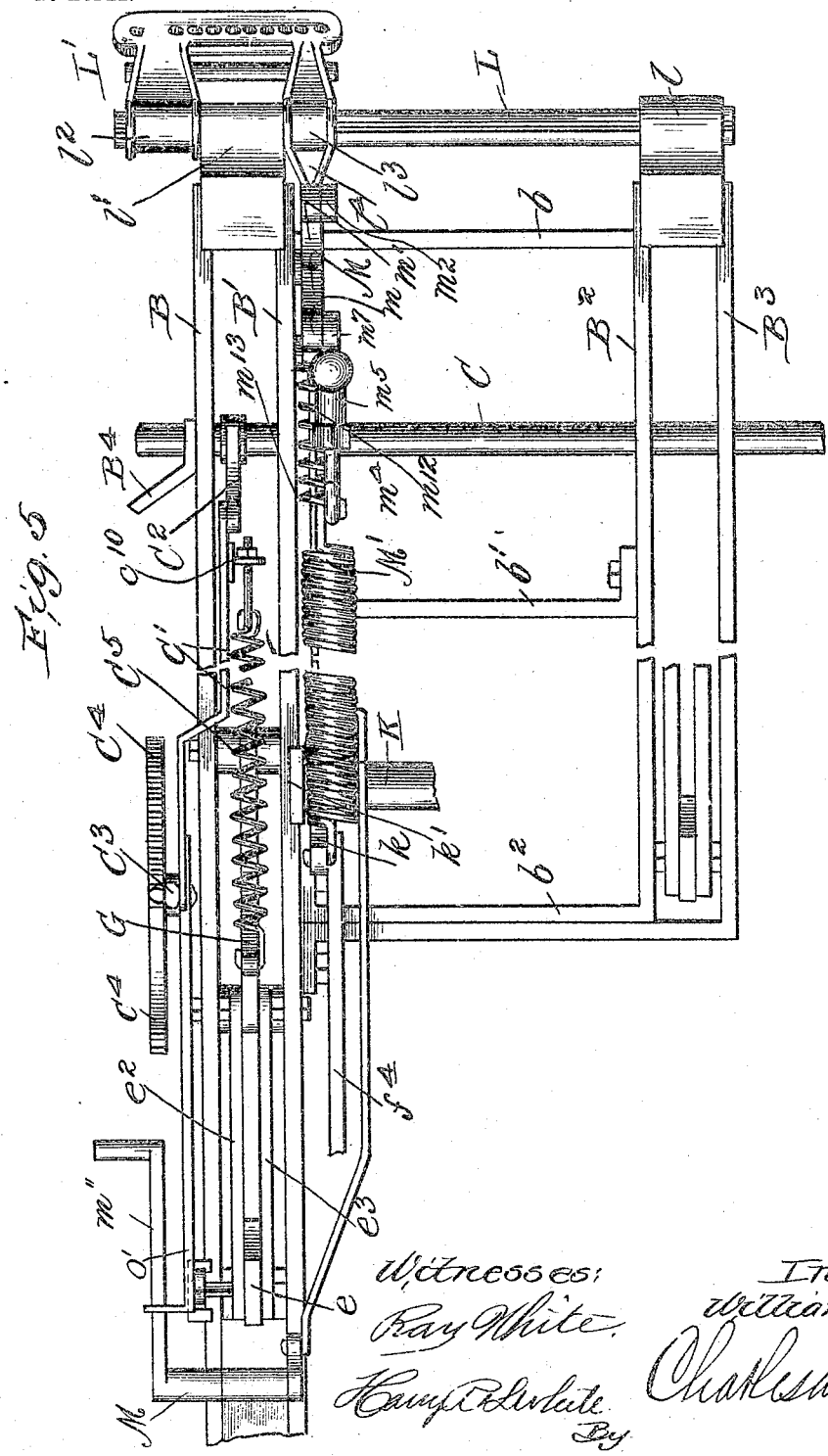

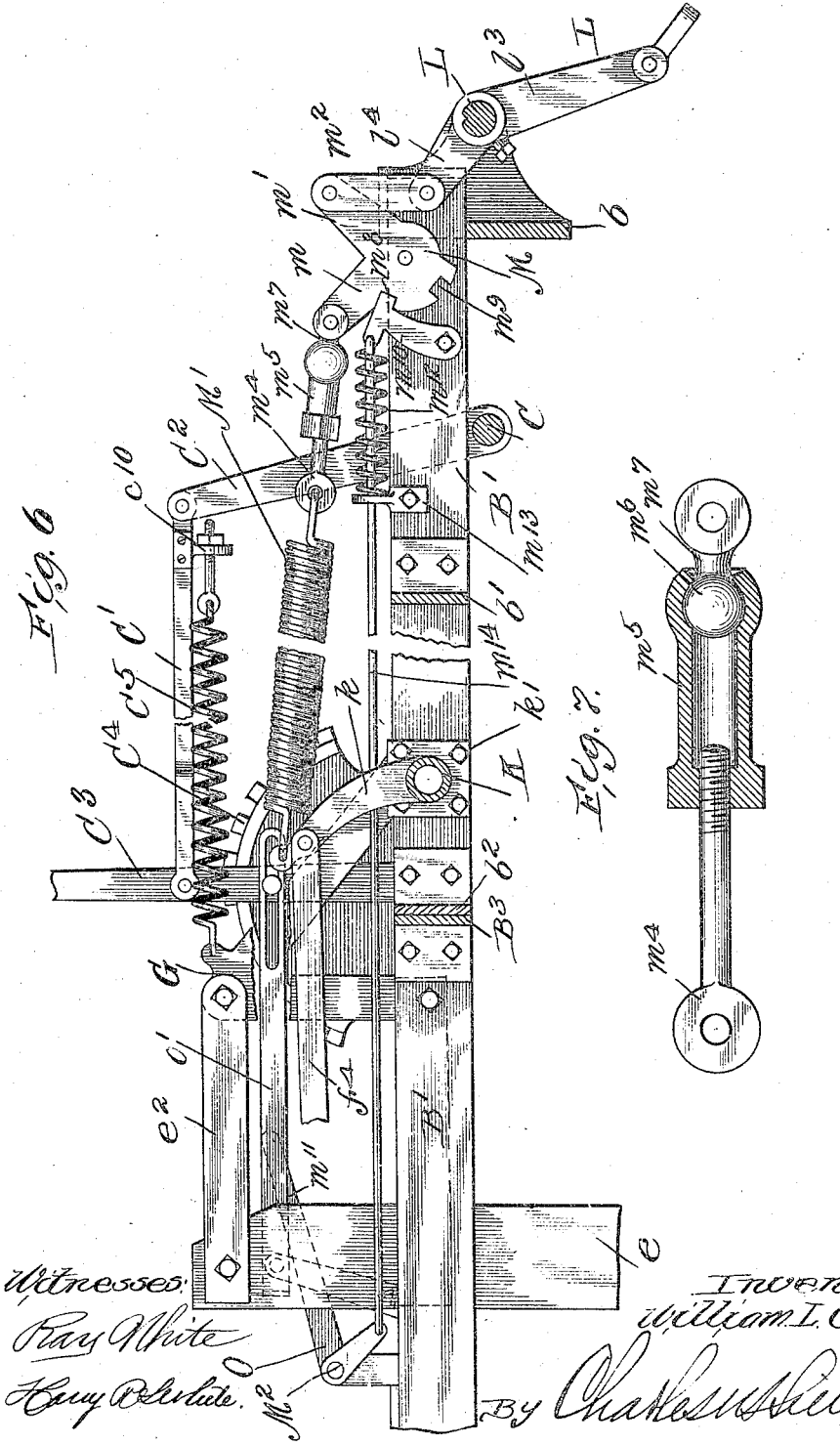

No. 755,614. PATENTED MAR. 29, 1904.
W. L. CASADAY.
GANG PLOW.
APPLICATION FILED MAY 7, 1903.
NO MODEL. 8 SHEETS—SHEET 7.
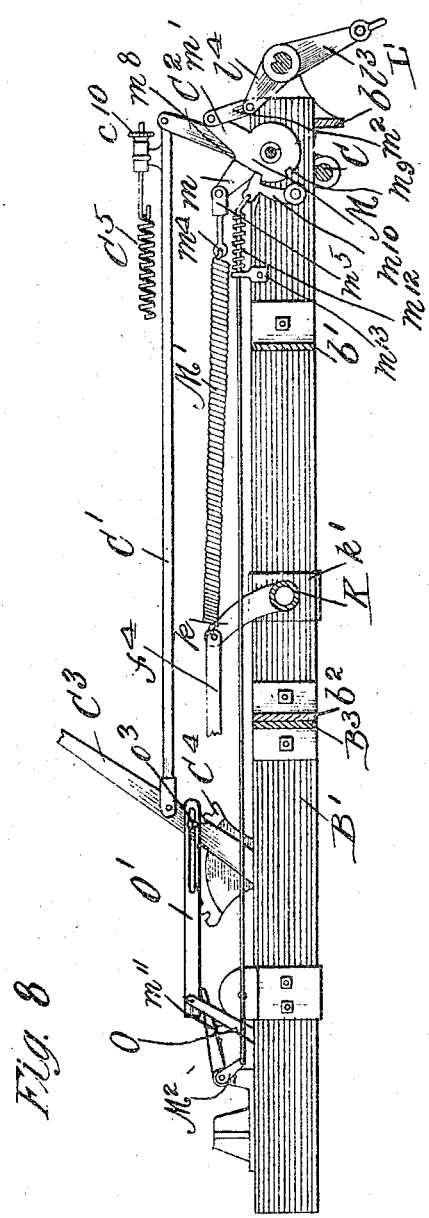
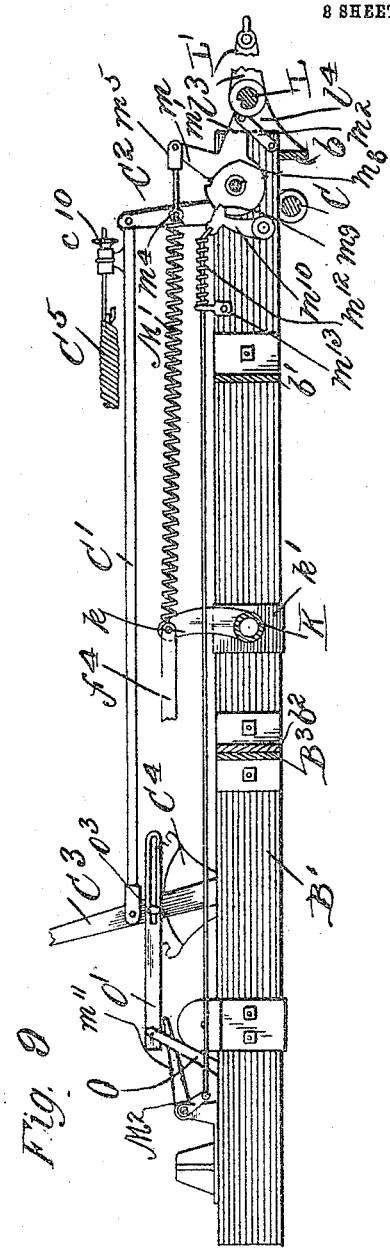
Witnesses
Inventor
William L. Casaday
By his Atty.

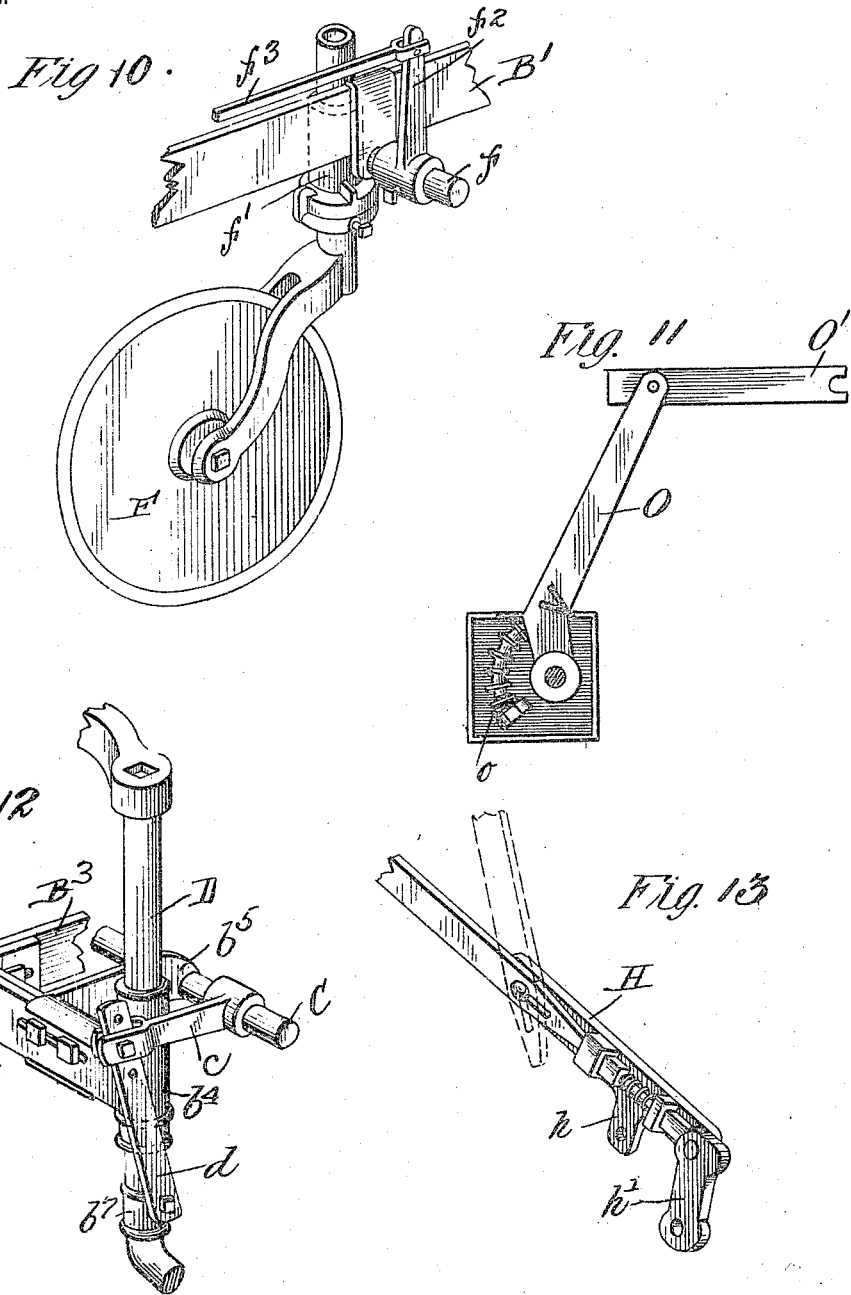

No. 755,614.  
Patented March 29, 1904.

UNITED STATES PATENT OFFICE.

WILLIAM L. CASADAY, OF SOUTH BEND, INDIANA.

GANG-PLOW.

SPECIFICATION forming part of Letters Patent No. 755,614, dated March 29, 1904.

Application filed May 7, 1903. Serial No. 155,973. (No model.)

*To all whom it may concern:*

Be it known that I, WILLIAM L. CASADAY, a citizen of the United States, and a resident of the city of South Bend, county of St. Joseph, and State of Indiana, have invented certain new and useful Improvements in Gang-Plows; and I do hereby declare that the following is a full, clear, and exact description of the same, reference being had to the accompanying drawings, and to the letters of reference marked thereon, which form a part of this specification.

This invention relates to improvements in gang-plows, and is shown embodied in a plow of the class set forth in my prior patent for gang-plows, No. 538,065, issued April 23, 1895, though obviously the invention is capable of use in any type of riding plows or cultivators and for many other purposes.

Heretofore with devices of the class described it has been difficult to lift the plows out of the ground without backing up the team, owing not only to the great weight of the plows, but to the resistance of the soil to such lifting. Usually powerful compound levers have been employed for the purpose, and these frequently require all the strength of the operator to lift the plows. The object of this invention is to provide a construction whereby the weight of the plows is balanced during operation and to so arrange, adjust, and combine the parts as to enable the plows and rolling colters to be lifted either during the plowing operation or when the plow is at rest by the draft of the team or other source of motive power.

The invention embodies many novel features, and it consists in the matters hereinafter described, and more fully pointed out and defined in the appended claims.

Figure 1:
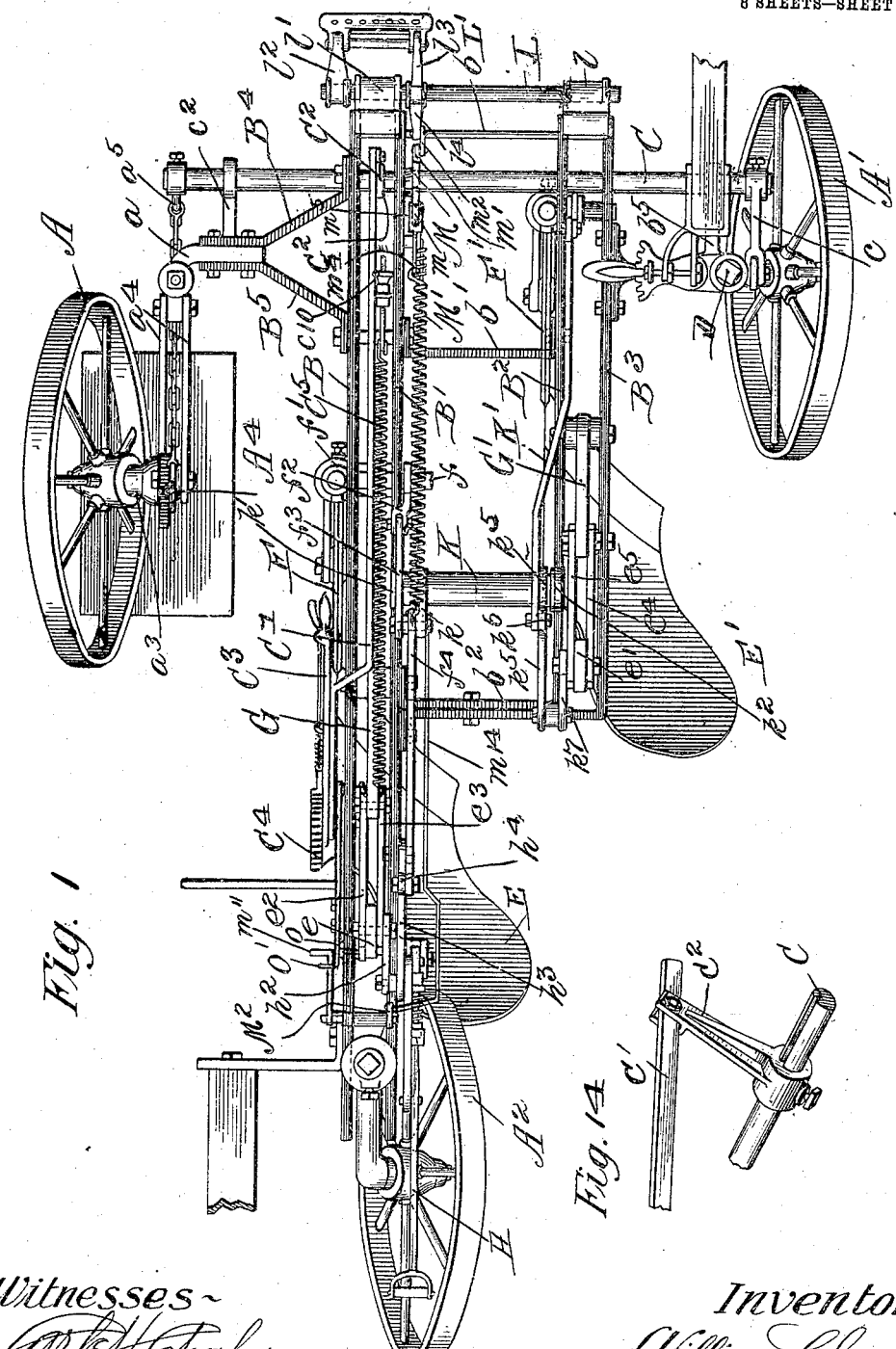
Figure 2:
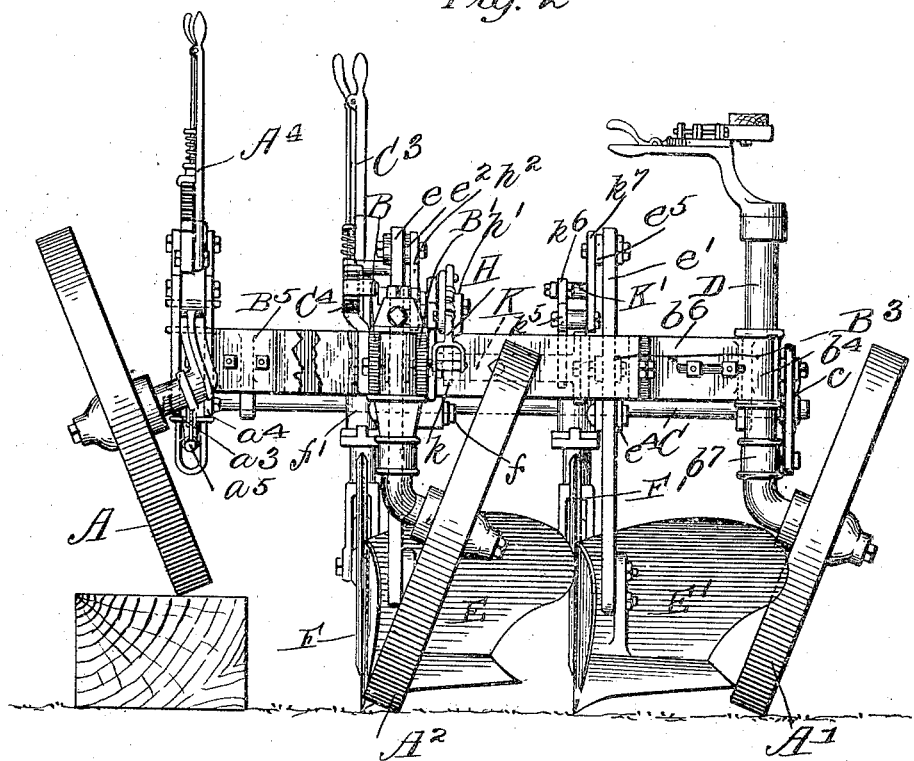
Figure 15:
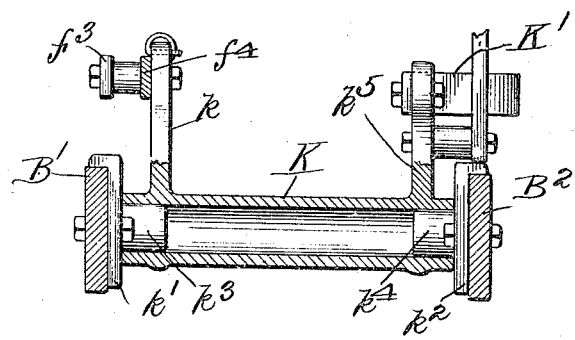

In the drawings, Figure 1 is a top plan view of a device embodying my invention, showing the rear end of the part of the frame thereof broken away. Fig. 2 is a rear elevation, partly in section, of the same. Fig. 3 is a side elevation of the same, showing the plows down. Fig. 4 is a similar view, partly broken away and showing the plows elevated. Fig. 5 is a fragmentary top plan view of the same. Fig. 6 is a longitudinal central section, partly broken. Fig. 7 is a longitudinal section of the turnbuckle by which the lifting-spring is connected with the two-armed segment. Figs. 8 and 9 are fragmentary longitudinal sections illustrating the operation of the draft-lift mechanism and showing the same respectively in the positions the same assume when the plows are down and when elevated. Fig. 10 is an enlarged fragmentary detail of the colter. Fig. 11 is a detail of the lock for the plow and a part of the shifting mechanism. Fig. 12 is a fragmentary perspective view of the means for elevating the frame. Fig. 13 is a detail of the adjusting-lever for the plows. Fig. 14 is a detail of a part of the end-frame-lifting device. Fig. 15 is an enlarged section of the shaft between the plows.

In said drawings the gang-plow in which my invention in the present instance is embodied is supported upon three wheels in the usual manner, as shown in my prior patent before recited, and comprises a frame adjustably supported on said wheels and comprising parallel longitudinal sills or frame-bars B B' and $B^2$ $B^3$ and arranged in pairs and between each pair of which the plows E E' are supported. Transverse frame members $b$ $b'$ $b^2$ rigidly connect said pairs of longitudinal frame members, as shown in Fig. 1. Rigidly connected on the side of the longitudinal frame members near the front end thereof are the laterally-directed brackets $B^4$ $B^5$, which converge and at their outer ends are rigidly bolted to a bearing member $a$ for the land-wheel A. Said bearing and wheel are of the usual construction, as shown, comprising a standard $a^3$, on which the wheel is obliquely journaled and which is connected with the bearing member $a$ by means of the toggle-links $a^4$. A chain extends from the crank-arm $a^5$ on the shaft C and connects with the lever $A^4$, provided with a notched segment in the usual manner and which by applying strain on said chain acts to lift the frame. Said transverse shaft C is provided at its other end with the inwardly-directed crank-arm $c$ and between the longitudinal frame members B and B' with the upwardly-directed crank-arm $C^2$. Said shaft is journaled on the bracket-arms $b^3$ $b^4$. On the furrow side of the frame a centrally-directed bracket $b^6$ is provided at its outer end with a vertical slide-bearing $b^4$, in which is journaled the shaft D of the furrow-wheel A', and said shaft is bent at the lower end in the usual manner to enable the wheel to track along the furrow. The bracket-arm $b^5$ is secured on the bracket $b^6$ and is shaped at its outer end to afford a bearing upon the shaft C, as shown in Fig. 12 and in dotted lines in Fig. 1. A collar $b^7$ is secured near the lower end of said shaft D, to which is pivoted an upwardly-extending link or bar $d$, the end of which is pivotally engaged at the extremity of the crank-arm $c$. Said bar $d$ and crank-arm $c$ form a toggle whereby when the shaft C is rotated to turn the crank-arm downwardly the frame is lifted upwardly on the shaft D, as shown in Fig. 4. In the same manner the crank-arm $a^5$ acts to elevate the land-side of the frame upon the sod-wheel A by bringing strain on the chain connecting the same with the lever. Means are provided for actuating said shaft comprising a rod C', pivoted at the extremity of the forwardly-directed crank-arm $C^2$, as shown in Fig. 1. Said rod C' leads rearwardly to the lever $C^3$, pivoted on the frame and provided with a spring-detent in the usual manner adapted to engage the toothed segment $C^4$. When the lever $C^3$ is drawn rearwardly to the position indicated in Fig. 4, the front end of the frame is lifted thereby, as shown in said figure, tending to throw the plows out of the ground.

Means are provided for lifting the plows E and E' and rolling colters F and F' from the furrows, as follows: Between each pair of longitudinal sills or frame members B B' $B^2$ $B^3$ are the upwardly-extending knees G and G', respectively, which are rigidly bolted between said sills and afford rigid connection for the levers whereby the plows are lifted. The knee G' is sufficiently in advance of the knee G to accommodate the arrangement of the plows one in advance and laterally of the other in the usual manner, and said plows are each provided with a vertical beam $e$ $e'$, positioned between the longitudinal frame members and at the rear of said knees and connected therewith by the toggle-bars $e^2$ $e^3$ $e^4$ $e^5$, respectively. Said toggle-bars, as shown, are of equal length and are connected with the upper ends of the beams $e$ $e'$ and the upper extremities of the knees G and G' and with said beams and the lower ends of said knees, respectively, and act when upward pressure is applied on the beams to move the same forwardly as well as upwardly. At the rear of the beams $e$ is the operating-lever H, which when the plows are down inclines rearwardly and downwardly, as shown in Fig. 3, and which, as shown, is pivoted at its inner end on the relatively short bar $h'$, pivoted on the sill, as shown in Figs. 3 and 4. Said lever H is provided with a laterally-directed arm $h$, which is also pivotally connected with the beam $e$ by means of the link $h^2$. It will be seen that the lever H, with its connecting-links, affords a compound toggle connection with the beams, enabling great lifting power to be applied thereto thereby, and acting when the lever is thrown forwardly to the position shown in Fig. 4 to lift the plow from the ground, and in the construction shown lifts the plows, as will hereinafter more fully appear.

The rolling colter F is pivoted between the longitudinal frame members B and B' in advance of the plow E, as shown, and is supported on a stud-shaft $f$, passing through a bracket supported on said frame members and is rigidly secured to a collar $f'$, in which the shaft of the colter is journaled. A crank-arm $f^2$ is rigidly secured on the shaft $f$, and a rod $f^3$ extends therefrom and is pivotally connected with an upwardly-extending crank-arm $k$, rigidly secured on the shaft K. A connecting-rod $f^4$ extends rearwardly from the crank-arm $k$ and connects with the arm $h^4$ of the lever $h^3$, so that the upward movement of the lever H and consequent elevation of the plows operates to partly rotate the shaft K, swinging the crank-arm $k$ thereon forwardly and swinging the rolling colter F on its pivot $f$ to the position shown in Fig. 4. Said shaft K, as shown, is tubular and journaled between the longitudinal frame members or sills B' and $B^2$ by means of the brackets $k'$ $k^2$, which engage over said sills and pass down along the side thereof and are rigidly bolted thereto and are provided with inwardly-directed trunnions $k^3$ $k^4$, respectively, which engage in the ends of said shaft K. In close proximity with the frame member B' is an upwardly-projecting integral arm $k^5$ on said shaft and which corresponds in shape with the bent lever $h^3$, pivoted on the frame member B', and is likewise provided with an upwardly-projecting arm $k^6$, corresponding with the arm $h^4$ on said lever $h^3$. The rear end of said lever $k^5$ is pivotally connected with the link $k^7$, corresponding with the link $h^2$ of the rear plow and which is similarly pivoted at its upper end on the shaft and acts when the shaft K is turned, together with the lever $k^5$, to provide a powerful toggle, acting to elevate the plow E'. A rod K' is pivotally connected with the arm $k^6$ and extends forwardly and engages the arm $f^2$ of the colter F', which is supported at the front end of the frame members B B' in manner similar to that shown in Fig. 10 at the colter F.

For the purpose of enabling the plows and colters to be lifted automatically by the draft of the team or other source of power for operating the plows a shaft L is journaled transversely at the front end of the frame in forwardly and downwardly projecting brackets $l$ $l'$, rigidly secured to the sills B B' $B^2$ $B^3$. Said shaft L is provided with a V-shaped or other key-seat, and a clevis L' is fitted thereon, with the arms $l^2$ $l^3$ thereof extending on each side of the bracket member $l'$. An arm $l^4$, integral with arm $l^3$, extends slightly out of alinement therewith above the shaft L, so that when the clevis hangs downwardly, as shown in Fig. 6, said arm $l^4$ is directed inwardly and upwardly. Pivoted on the frame member or sill B' is a segment M, provided on its upper side with the arms $m\ m'$, directed at approximately a right angle from each other. With the forwardly-directed arm $m'$ the arm $l^4$ is connected by means of a link $m^2$. To the other or rearwardly-directed arm $m$ one end of a powerful coiled spring M' is connected, and the other end thereof extends rearwardly and is connected with the extremity of the lever or crank arm $k$ on the shaft K. Means are provided for adjusting the tension of said spring on said arm comprising a turnbuckle which forms the connection between the same and the arm $m$ of the segment. Said turnbuckle, as shown, comprises a threaded eyebolt $m^4$, secured to the forward end of said spring, as shown in Figs. 1 and 7, and a sleeved nut $m^5$, which engages around a ball-shaped end $m^6$ of a link $m^7$, pivotally engaged on said arm $m$, thus enabling any desired tension within the capacity of the spring to be attained by the adjustment of the turnbuckle. Said segment in its rear side and below the arm $m$ is provided with notches $m^8\ m^9$, located at approximately ninety degrees apart, and a spring-operated latch or detent $m^{10}$ is pivoted on the frame member B' in position to engage in either of said notches. A rod secured on said detent extends rearwardly along the frame and is connected at its rear end with the short arm of a bell-crank lever $M^2$, the long arm $m^{11}$ of which extends forwardly and is positioned and shaped to conveniently be engaged by the foot of the driver seated on the machine. A spring $m^{12}$ bears at its rear end against a stop $m^{13}$ and acts to hold said detent in positive engagement in one of said notches in the segment until released by the operator. Inasmuch as the draft of the team is applied directly to the clevis L', which, in fact, is a powerful lever, it is obvious that should the operator release the detent from the notch $m^8$ the segment will be partly rotated by the draft of the team on the clevis, thereby increasing the tension on the spring M' and lifting the plows and colters. A powerful spring or springs $C^5$ is also adjustably engaged to the rod C', connected with the crank $C^2$, which acts to elevate the frame. In this instance the rear ends of said spring or springs are secured on the knee G and the tension adjusted by means of the nut $c^{10}$ to approximately balance the weight of the front of the frame, so that when the lever $C^3$ is shifted rearwardly, as shown in Fig. 4, said spring or springs support the greater part of the weight of the frame.

A lock is provided to hold the plows in operative position, comprising a lever O, pivoted on the side frame member B' and extending vertically upward and held at the forward limit of its movement by a coiled spring $o$, as shown in Fig. 11. Said lever is provided with an angular detent or catch $o'$ thereon, which engages in a notch in the rear side of the plow-beam $e$ or on one of the links thereof and acts normally to hold the plow from rising. At the upper end of said lever a connecting-rod O' is pivotally secured and which opposite the segment $C^4$ is slotted longitudinally and adapted to receive the pin $o^3$, carried on the lever $C^3$. Said lever may thus be adjusted to lift the front end of the frame to a considerable height without releasing the lock for the plows. Should said lever be moved rearwardly to the farthest extent, however, it not only elevates the front end of the frame as high as possible, but also simultaneously releases the plows from the lock, permitting the same to rise.

From the construction shown it is possible to elevate the plows a distance nearly equal to the distance which the frame may be elevated before the lock disengages from the plow, and if a higher elevation is desired the lowering of the crank-arm $m^{11}$ detracts the detent $m^{10}$ from the segment and the plows are immediately drawn upward by the draft of the team.

The operation is as follows: The running-gear, plows, and colters are similar in number and arrangement to those set forth in my prior patent before mentioned, and improved means are provided in the present construction for elevating the front end of the frame on the front wheels, actuated by the lever $C^3$, the shifting of which serves to rotate the shaft C at the front end of the frame from the link. It also draws the bearing of the wheel A forwardly, thus elevating that side of the frame. Ordinarily the amount of elevation of the frame in lifting the plow except when upon the road is slight, being merely sufficient to regulate the depth of the cut, so that ordinarily the lever $C^3$ is not thrown rearwardly sufficiently to actuate the rod O' and release the lock for the plow. When, however, it is desired to elevate the front end of the frame to the greatest possible extent this occurs, leaving the plows free to rise if desired. The plows may now be raised either by means of the lever H alone or preferably when the draft of the team is applied thereto by releasing the detent $m^{12}$ from the notch $m^8$, whereupon the clevis is pulled upwardly by the team, thereby drawing the arm $m'$ downwardly to the position shown in Fig. 9 and exerting the full power of the team in lifting the plows. Of course inasmuch as the tension of the spring M' is adjusted to approximately balance the weight of the plows the plows and colters are very easily elevated by means of the lever H at all times except when the device is in actual use cutting the furrows, in which case, owing to the weight of material upon the plows and in many instances the continuous draft of the team thereon, it would be very difficult to lift the plows without stopping the team. With the construction described, however, it is obvious that the plows can be lifted much easier when turning the furrow than is the case ordinarily with plows when at rest. It will also be readily seen that the draft of the spring or springs C⁴ acts to practically balance the weight of the frame and greatly aids in elevating the front end of the frame should the same be necessary. Obviously, while I have described the draft appliance embodied in this invention in connection with a gang-plow, the device is capable of many variations and modifications and is adaptable for other uses than those herein shown, and I do not desire to be limited specifically either to the exact form in which the construction is illustrated nor to its application herein shown and described, as obviously many details of construction may be varied without departing from the principles of this invention.

I claim as my invention—

1. The combination with the frame of an agricultural implement, of a lever pivoted thereon and affording means for applying draft thereto, a spring connected with said lever and acting normally to support the weight of operating mechanism of the machine, a detent holding said draft mechanism in operative position and means for releasing said detent whereby the draft on said lever acts to elevate the mechanism of the machine.

2. The combination with the frame of an agricultural implement, of operating mechanisms thereon, a lifting-lever acting to support said mechanisms out of operative position, a draft-lever pivoted on the frame, a spring operatively connected with said draft-lever at one end with the lifting-levers at the other end, a detent acting to hold the draft-lever in a retracted position and means for releasing said detent whereby the draft on said lever acts to throw the operating mechanism upwardly and support the same.

3. The combination with the frame of an agricultural implement, of a plow supported thereon, one or more lifting-levers pivoted on the frame and engaging the plow and acting to lift same, a draft-lever pivoted at the front end of the frame, a spring operatively connected with said lifting-lever and draft-lever and adjusted normally to support the weight of the plow, a detent acting to hold the draft-lever in operative position and means for releasing said detent whereby draft on said draft-lever acts to throw the plow upwardly and support the same.

4. The combination with a frame and the wheels thereof, of a plow adjustably supported therein, lifting-levers whereby said plows are adjusted into and out of operative position, an extensible draft appliance at the front end of the frame, a spring adjustably connected therewith and with said lifting-levers and adjusted normally to support the weight of the plow, a detent normally holding the draft appliance retracted and means for releasing said detent whereby the draft appliance is drawn forwardly and increasing the tension on the spring and elevating the plows.

5. In a riding-plow the combination with the frame, of a plow vertically adjustable therein, a lifting-lever engaged on the frame and plow and acting to elevate the plow, a hand-lever engaged upon the lifting-lever whereby the plow is adapted to be elevated manually, a spring secured at one end on one of said levers and operatively connected with a draft appliance, a detent holding said spring at a predetermined tension and means for releasing said detent whereby the draft of the teams of the like acts on said spring to elevate the plow.

6. In a gang-plow, the combination with the frame and wheels thereof, of means for elevating the front end of the frame when in operation, a plurality of vertically-movable plows adjustably supported in said frame one in advance and laterally of the other, of a series of compound levers acting to simultaneously lift both of said plows, means for actuating the same manually, a strong spring engaged on one of said levers and extending forwardly and normally acting to support a part of the weight of the plows and means under the control of the operator for applying the draft of the team to said spring thereby lifting the plows.

7. In a gang-plow the combination with the frame and its supporting-wheels, of means for elevating the front end of the frame thereon when in operation, a plurality of vertically-adjustable plows one in advance and laterally of the other, a series of compound levers pivoted on the frame and operatively connected with and acting to lift said plows, a hand-lever engaging the same and adapted to permit the plows to be elevated manually, an adjustable draft mechanism, a spring attached to one of said levers and adjustably connected on the draft mechanism, a detent holding said draft mechanism retracted and means under the control of the operator for releasing said detent whereby the draft of the machine acts to elevate the plows.

8. In a gang-plow, the combination with supporting-wheels of a frame, a plurality of plows vertically movable in the frame and positioned one in advance and laterally of the other, lifting-levers pivoted on the frame and operatively connected with all of the plows, means for actuating said levers manually to adjust the plows, a draft-lever at the front end of the machine, a bent lever pivoted adjacent thereto and connected at one end with the draft-lever, a spring adjustably engaged thereon at one end and at the other engaged to one of the lifting-levers, a detent holding said draft-lever in operative position and means under the control of the operator for releasing said detent therefrom whereby the draft of the team or the like is applied to lifting the plow.

9. The combination in a gang-plow with the frame and its wheels, of vertically-movable plows carried thereby, a draft appliance, a spring connecting said draft appliance with the plows and acting to communicate the draft thereto in lifting the plows, a detent acting to hold said plows from lifting until the detent is released.

10. In a gang-plow the combination with the frame and supporting-wheels, of vertically-movable plows therein, colters adjustably supported in the frame in advance of each plow, a plurality of levers pivoted on the frame and connected with the plows and colters, a crank also journaled on the frame and with which all of said levers are connected, a strong spring engaged on said crank, a draft-lever to which the forward end of said spring is adjustably engaged, a detent normally holding said draft-lever at an angle with the line of draft, means for releasing said detent whereby the draft is applied to said spring and acting to elevate plows and colters simultaneously.

11. The combination with the frame of a gang-plow, of vertically-movable plows and colters therein and a plurality of compound lifting-levers engaging the same, a crank journaled on the frame and with which said levers are connected, a hand-lever connected with said levers and acting simultaneously to raise the plows and colters and means for elevating the same operated by the draft of the machine.

12. The combination with the frame of a gang-plow, of a plurality of plows and colters supported therein, a plurality of compound lifting-levers engaged thereon, a crank with which all of said levers are connected, a draft-clevis pivoted at the front end of the frame, an integral rearwardly-extending lever-arm thereon, a two-armed segment pivotally connected by one of its arms with said lever-arm, a detent engaging said segment, a strong pulling-spring engaged on said crank-arm and with the remaining arm of said segment, an operating-lever, a rod connecting said pawl or detent with the operating-lever and a latch acting to hold the plows in operative position and adapted to be released by the operating-lever simultaneously with the release of the detent.

13. The combination with a frame, of plows and colters vertically movable therein, a two-armed segment pivoted on the frame, a spring adjustably engaged on one of said arms and connected with said plows, a draft-lever engaging the other arm, a detent holding said draft-lever at an angle with the line of draft, a latch holding the plows and colters down and means under the control of the operator for simultaneously releasing said latch and detent whereby the draft of the team or the like is applied to elevate the plows and colters.

14. The combination in a gang-plow, of plows and colters upwardly movable therein and manually-operated means acting to operate the same simultaneously and resilient means under control of the operator adapting the motive power for the machine to be applied to lifting the plows and colters.

15. The combination with the frame of a gang-plow, of a plurality of plows and colters upwardly movable therein, of a detent acting to lock said plows in their operative position, a lever and segment adapted to elevate the front end of the frame, lifting-levers engaged on the plows and colters, a clevis pivoted at the front end of the frame and normally held at an angle with the line of draft, a notched segment pivoted on the frame and in engagement with said clevis and adapted to be partly rotated by the clevis when lifted into the line of draft, a spring adjustably engaged on said segment and with the elevating-levers of the plows and colters, a detent holding said segment and clevis from movement and a tripping-lever connected with said detent and positioned at the rear of the machine and acting to simultaneously release said detent and the latch for the plow, thereby applying the draft to the elevation of the plows and colters.

16. In a gang-plow the combination with the frame and its supporting-wheels, of means for elevating the front end of the frame comprising a shaft journaled at the front end thereof, crank-arms on said shaft, a link on the axle of one of the wheels on which one of said cranks engages, a toggle-lever connected with the opposite wheel and also operated by one of said cranks, and a lever acting to partly rotate said shaft thereby acting to lift the frame upwardly from the wheels, a yoke engaged by the last-named lever, a locking-lever for the plows connected therewith and means operated by the draft of the team or the like adapted to elevate the plows.

17. In a gang-plow the combination with the frame and the supporting-wheels, of means for elevating the frame on the front wheels thereof, upwardly-movable plows and colters, a detent normally holding the same in operative position, lifting-levers acting to move the plows and colters upwardly and support the same, a spring secured on one of said levers, a draft appliance to which the front end of the spring is engaged, and a lever acting to release the latch holding the plow and the detent engaging the draft appliance whereby the draft of the team or the like is applied to the lifting of the plows, a lever acting to elevate the front end of the frame and a connection thereon acting to simultaneously release the plows and colter.

18. In a gang-plow the combination with a frame and its supporting-wheels, of a lever acting to elevate the front of the frame thereof, rigid upwardly-directed knees secured on said frame, a plow at the rear of each knee, parallel bars connecting the same therewith, compound toggle-levers engaged on the plows and frame, a compound hand-lever engaging one of the same and adapted to permit the plow to be lifted manually, a two-armed segment pivoted on the frame, a spring connecting one of the arms with one of said levers for lifting the plows and a draft-lever pivoted on the frame and engaging the other of said arms, a detent holding the same normally at an angle with the line of draft and means adapted to release said detent simultaneously with the elevation of the frame thereby applying the draft to said spring and lifting the plows.

19. The combination with a frame and its supporting-wheels, of rigid knees engaged on the frame one in advance and laterally of the other, vertically-movable plows at the rear of each knee, parallel bars pivoted on the knees and the adjacent plows and acting to move the plow upwardly and forwardly compound lifting-levers engaged on one of the plows, and the frame, a crank journaled in the frame, levers secured thereto and operatively connected with the other plow, rolling colters pivoted to swing upwardly in the frame, levers for the colters connected with said crank, a draft-lever, a spring engaged on said crank and operatively connected with the draft-lever, means for holding said draft-lever at an angle with the line of draft and means for releasing the draft-lever and acting to direct the draft upon said spring thereby elevating the plows.

20. In a machine of the class described the combination with the supporting-frame and wheels therefor, of vertically-movable plows and colters therein, a lifting-spring connected with said plows and colters, a two-armed segment pivoted on the frame, draft-levers also pivoted on the frame, a link pivotally connecting one of the arms of the segment with the end of the draft-lever, a turnbuckle connecting the other arm of the segment with said spring, said segment having notches in its periphery and a spring-controlled detent engaging in said notches and acting to release the draft-lever, whereby the draft is applied directly to said springs acting to elevate the plows and colters.

21. In a gang-plow the combination with the frame and supporting-wheels, of means for elevating the front end of the frame, vertically-movable plows and colters supported in the frame, a latch acting to hold the plows in operative position, levers for lifting the plows, a draft-spring engaged thereon and operatively connected with a draft appliance, a detent normally holding the draft-spring out of action and means for simultaneously elevating the end of the frame and releasing the latch for the plow and said detent whereby the draft is applied on said spring thereby elevating the frame and the plows and colters in the frame simultaneously.

22. In a gang-plow the combination with the supporting-wheels, of a frame, a shaft journaled at the forward end thereof, toggle-joints connecting said shafts with the axles of the side wheels, a lever adapted to partially rotate said shaft to elevate the frame, a plurality of vertically-adjustable plows, an upright beam on each of said plows, a knee rigidly secured on the frame forward of each plow, toggle-bars connecting the beams and knees of corresponding plows, a lever for manually elevating said plows and means whereby said plows may be elevated by the draft of the team or the like.

23. In a gang-plow the combination with a vertically-adjustable frame, of a plurality of plows therein arranged one forwardly and laterally of the other, a colter forward of each plow, a knee rigidly secured on the frame in front of each beam, toggle-arms connecting said beams and knees, a bent lever pivoted at one end on the frame, a link pivoted at the other end thereof and on one beam, a shaft journaled in said frame, a rigid arm thereon, a rod connecting said arm and bent lever, means carried on the shaft acting by the rotation thereof to adjust the forward plow and colters simultaneously with the rear plow and means operated by the team or the like for actuating said bent lever.

24. In a gang-plow the combination with a frame and supporting-wheels therefor, of a plurality of plows arranged one in front and laterally of the other, a colter in front of each plow, a beam on each of said plows extending upwardly through the frame, a knee rigidly secured on the frame adjacent to each beam, toggle-arms pivotally connecting adjacent beams and knees, a shaft journaled in said frame, a plurality of compound levers connected with said shaft and the plows and colters and means whereby said shaft is rotated by the draft of the team or the like and the plows and colters simultaneously elevated.

25. In a gang-plow the combination with the frame, of a plurality of plows and colters pivotally supported thereon, a shaft journaled in said frame and having an upwardly-extending arm thereon, a bent lever pivotally connected with one plow and with the frame, a rod connecting said lever with said arm, a lever carried on the shaft and pivotally connected with the other plow, toggle means connecting the colter with said shaft, a notched segment pivoted on the frame having outwardly-directed arms thereon, a draft-lever engaged on one arm, a coiled spring engaged on the other and on the shaft-arm acting when draft is applied to the draft-lever to simultaneously raise said plows and colters.

26. In a gang-plow the combination with the rear and laterally supporting wheels of a vertically-adjustable frame carried thereon, a shaft journaled on said frame and having a crank-arm at each end thereof, toggle means connecting said arms with the axles of the lateral wheels and acting when said shaft is rotated to raise and lower said frame, a notched segment rigidly secured on the frame, a lever pivoted adjacent thereto and adapted to engage therewith, a rod connecting said lever with the shaft, a lock carried on the frame and adapted to hold the plows at their lowermost position and a slotted rod connecting said lock with the lever and adapted to release the lock from said plows.

In testimony whereof I have hereunto subscribed my name in the presence of two subscribing witnesses.

WILLIAM L. CASADAY.

Witnesses:
H. H. GINZ,
R. E. RICHARDES.